(12) United States Patent
Loo et al.

(10) Patent No.: US 9,146,596 B2
(45) Date of Patent: Sep. 29, 2015

(54) APPARATUS AND METHODS FOR THERMAL MANAGEMENT OF A COMPUTING DEVICE

(75) Inventors: Kenneth Ryan Loo, San Jose, CA (US); Felix Jose Alvarez Rivera, San Jose, CA (US)

(73) Assignee: Google Inc., Mountain View, CA (US)

( * ) Notice: Subject to any disclaimer, the term of this patent is extended or adjusted under 35 U.S.C. 154(b) by 597 days.

(21) Appl. No.: 13/443,484

(22) Filed: Apr. 10, 2012

(65) Prior Publication Data

US 2015/0220121 A1 Aug. 6, 2015

(51) Int. Cl.
*H05K 5/00* (2006.01)
*H05K 7/20* (2006.01)
*G06F 1/20* (2006.01)

(52) U.S. Cl.
CPC ........................................ *G06F 1/203* (2013.01)

(58) Field of Classification Search
USPC ............... 361/679.46–679.51, 679.01–679.4, 361/688–699; 363/15, 34, 108, 143, 67, 363/129; 454/184–186
See application file for complete search history.

(56) References Cited

U.S. PATENT DOCUMENTS

| | | | |
|---|---|---|---|
| 5,914,856 A * | 6/1999 | Morton et al. ................. | 361/690 |
| 6,304,434 B1 | 10/2001 | Markow | |
| 6,400,568 B1 * | 6/2002 | Kim et al. ..................... | 361/697 |
| 7,287,965 B2 | 10/2007 | Vogeley et al. | |
| 2005/0041392 A1 * | 2/2005 | Chen ............................. | 361/695 |
| 2005/0284612 A1 | 12/2005 | Machiroutu | |
| 2009/0008064 A1 | 1/2009 | Nicole et al. | |

OTHER PUBLICATIONS

"A New Class of Fluid Movers. Huge Performance. Small Package", Influent Corp., retrieved on Jul. 10, 2012 from www.influentmotion. com, 1 page.
"CurieJet Liquid Micro Pump", MicroJet, retrieved on Jul. 10, 2012 from http://www.microjet.com.tw/en/products/list. php?pin=49600c3d3d05596e2da84e1774f0c398&type=s, 1 page.

* cited by examiner

*Primary Examiner* — Jerry Wu
(74) *Attorney, Agent, or Firm* — Brake Hughes Bellermann LLP

(57) ABSTRACT

In accordance with aspects of the disclosure, a system and methods for thermal management of at least one processor positioned within a computing device include drawing external fluid into an enclosure of the computing device via an inlet aperture with use of at least one active pump positioned within the enclosure, directing the drawn fluid from the inlet aperture through an inlet channel formed within the enclosure to the active pump, passing the drawn fluid over the processor positioned within the enclosure by directing the drawn fluid from the active pump through an outlet channel formed within the enclosure, and expelling the drawn fluid from the enclosure of the computing device via an outlet aperture with use of the active pump after passing the drawn fluid over the processor so as to provide thermal management of the processor.

20 Claims, 10 Drawing Sheets

APPARATUS AND METHODS FOR THERMAL MANAGEMENT OF A COMPUTING DEVICE

TECHNICAL FIELD

This description relates to thermal management of a computing device.

BACKGROUND

A processor of a computer generates heat, and cooling is necessary to maintain an acceptable operating temperature. An overheating processor is susceptible to malfunction or failure. A heatsink cooled by airflow may reduce operating temperature, and airflow patterns generated by a fan may reduce temperature by actively exhausting heated air. Some computers, such as laptops, use forced air cooling of the processor through small ports. However, over time, a heatsink and/or fan may be obstructed by dust or other objects placed near the small ports. Unfortunately, this may contribute to overheating and cause of malfunction and failure in laptops. As such, there currently exists a need to improve the cooling of processors within computers including laptops.

SUMMARY

In accordance with aspects of the disclosure, a method for thermal management of at least one processor positioned within a computing device includes drawing external fluid into an enclosure of the computing device through an inlet aperture with use of at least one active pump positioned within the enclosure, directing the drawn fluid from the inlet aperture through an inlet channel formed within a first area of the enclosure to the at least one active pump, passing the drawn fluid over the at least one processor positioned within a second area of the enclosure by directing the drawn fluid from the at least one active pump through an outlet channel formed within the second area of the enclosure, wherein the active pump includes one or more moveable membrane structures, the movement of which generates a pressurized fluid flow along a path from the inlet channel to the outlet channel, and expelling the drawn fluid from the enclosure of the computing device via an outlet aperture with use of the at least one active pump after passing the drawn fluid over the at least one processor so as to provide thermal management of the at least one processor.

In accordance with aspects of the disclosure, a computing device includes at least one processor, an enclosure including an inlet aperture through which external fluid is drawn into the computing device, an active pump positioned within the enclosure and configured to draw the external fluid through the aperture into the computing device, wherein the active pump includes one or more moveable membrane structures, the movement of which generates a pressurized fluid flow along a path from an inlet channel to an outlet channel, the inlet channel formed within the enclosure for directing the drawn fluid from the inlet aperture through a first area of the enclosure to the at least one active pump, the outlet channel formed within the enclosure for directing the drawn fluid from the at least one active pump through a second area of the enclosure and for passing the drawn fluid over the at least one processor positioned in the second area of the enclosure, and an outlet aperture for expelling the drawn fluid from the enclosure of the computing device after passing the drawn fluid over the at least one processor so as to provide thermal management of the at least one processor.

In accordance with aspects of the disclosure, a system for thermal management of at least one processor positioned within a computing device includes means for drawing external fluid into an enclosure of the computing device via an inlet aperture with use of at least one active pump positioned within the enclosure, means for directing the drawn fluid from the inlet aperture through an inlet channel formed within a first area of the enclosure to the at least one active pump, means for passing the drawn fluid over the at least one processor positioned within a second area of the enclosure by directing the drawn fluid from the at least one active pump through an outlet channel formed within the second area of the enclosure, and means for expelling the drawn fluid from the enclosure of the computing device via an outlet aperture with use of the at least one active pump after passing the drawn fluid over the at least one processor so as to provide thermal management of the at least one processor.

The details of one or more implementations are set forth in the accompanying drawings and the description below. Other features will be apparent from the description and drawings, and from the claims.

BRIEF DESCRIPTION OF THE DRAWINGS

FIG. 2 is a process flow illustrating an example method for thermal management of at least one processor in a computing device.

DETAILED DESCRIPTION

Figure 1A:
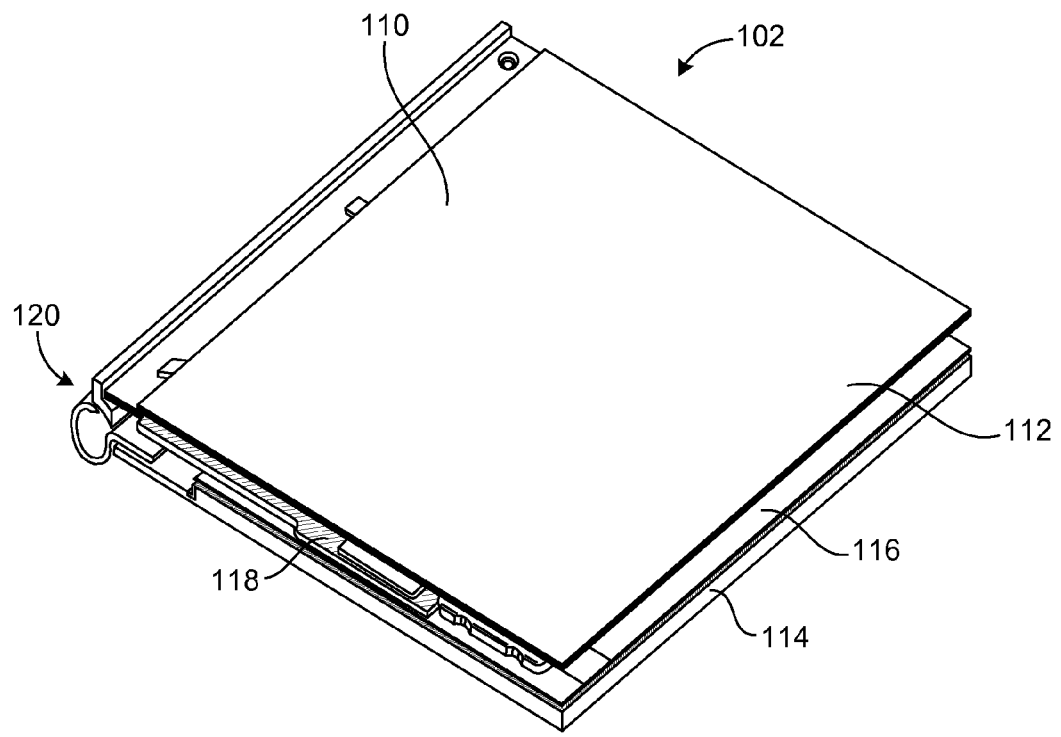
FIGS. 1A-1G are conceptual diagrams illustrating an example system for thermal management of at least one processor in a computing device.

FIG. 1A is conceptual diagram illustrating an example system 100 for thermal management of at least one processor in a computing device 102.

The computing device 102 may include an enclosure 110 having one or more structural components including a first cover portion 112, a second cover portion 114, an internal base portion 116, a printed circuit board (PCB) portion 118, and a hinge assembly 120. In an implementation, the enclosure 110 may be configured with a specialized chassis configured to integrate computing components within the computing device 102, such as, for example, a processor, a system memory, a static storage memory, one or more disk drives, one or more network interface components, a display component, one or more user input components, one or more image capture components, and a bus or other communication mechanism for interconnecting the subsystems and components. The enclosure 110 may be configured to provide power to the integrated computing components via a battery, cable, etc.

The first cover portion 112 is a structural component of the enclosure 110 configured for protecting the computing device 102. The first cover portion 112 may be referred to as a D-cover. The first cover portion 112 comprises a first outer shell casing (e.g., upper external shell casing) of the enclosure 110 configured for protecting the subsystem and components positioned within the enclosure 110 of the computing device 102. The second cover portion 114 is a structural component of the enclosure 110 for protecting the computing device 102. The second cover portion 114 may be referred to as a C-cover.

The second cover portion 114 comprises a second outer shell casing (e.g., lower external shell casing) of the enclosure 110 for protecting the subsystem and components positioned within the enclosure 110 of the computing device 102. In various implementations, the first and second cover portions 112, 114 may be formed with a plastic material or some other rugged material, such as various composite polymers, for protecting the subsystem and components positioned within the enclosure 110 of the computing device 102.

The internal base portion 116 is a structural component of the enclosure 110 configured for mechanically supporting the internal subsystems and components of the computing device 102 including the first and second cover portions 112, 114, the PCB portion 118, and the hinge assembly 120. In an implementation, the internal base portion 116 may be referred to as a Mylar sheet, wherein Mylar is a polyester film having high tensile strength, transparency, and electrical insulation properties. However, in various other implementations, it should be appreciated by those skilled in the art that any type of material having high tensile strength, transparency, and/or electrical insulation properties including plastic or polymer may be used to form the internal base portion 116.

The printed circuit board (PCB) portion 118 is a structural component of the enclosure 110 configured for mechanically supporting and electrically connecting the internal subsystems and components of the computing device 102 including, for example, the at least one processor, system memory, etc. The PCB portion 118 may comprise a multi-layer board (MLB). The MLB may be configured to comprise one or more circuits and chipsets attached thereto including the at least one processor. In an implementation, the MLB comprises a composite layer formed of multiple layers bonded together to reduce the footprint of the PCB while maintaining circuit size and/or complexity. The MLB composite may include any number of multiple layers depending on the complexity of the circuit. The separate layers are typically insulated from each other layer to avoid short-circuit problems, and the separate layers are typically interconnected by way of conductive through holes or plated vias.

The hinge assembly 120 is a structural component of the enclosure 110 configured for mechanically supporting and connecting subsystems and components of the computing device 102 including, for example, connecting a display (not shown) to the enclosure 110. The hinge assembly 120 may be referred to as a hinge barrel having a sectional barrel structure secured by a pivot. The sectional barrel structure may be configured with a hollow cylinder shaped section such that the rotational bearing force is applied to the pivot. As such, the hinge assembly 120 may be configured as a type of bearing that rotationally interconnects at least two structural components (e.g., the display (not shown) and the enclosure 110) and provides an angle of rotation therebetween. The structural components connected by the hinge assembly 120 rotate relative to each other about a fixed axis of rotation along the length of the enclosure 110, for example, as shown in FIG. 1A. In various implementations, the hinge assembly 120 may be formed of any type of material having high strength properties including plastic or polymer.

In the example of FIG. 1A, the computing device 102 may be implemented using any appropriate combination of hardware and/or software configured for interfacing with a user including a user device, a user interface (UI) device, a user terminal, a client device, or a customer device. As shown in FIG. 1A, the computing device 102 may be implemented as a portable computing device, such as, for example, a laptop computer. The computing device 102 may be implemented as some other type of computing device adapted for interfacing with a user, such as, for example, a personal computer (PC), a notebook computer, a personal digital assistant (PDA), and a tablet computer. The computing device 102 may be implemented as a portable communication device (e.g., a mobile communication device including a smart phone, a wireless cellular phone, etc.) adapted for interfacing with a user and for wireless communication over a network, such as, for example, a mobile communications network.

Figure 1B:
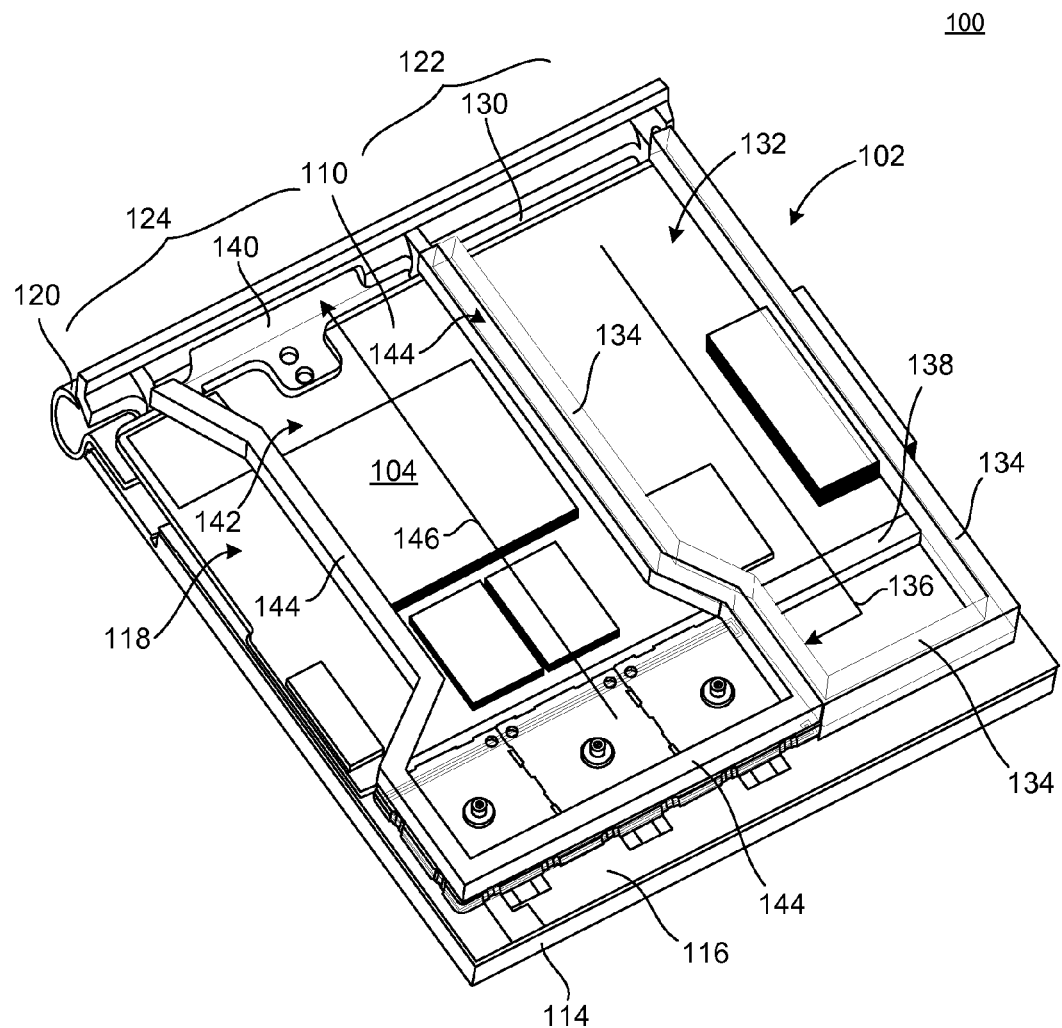
Figure 1C:
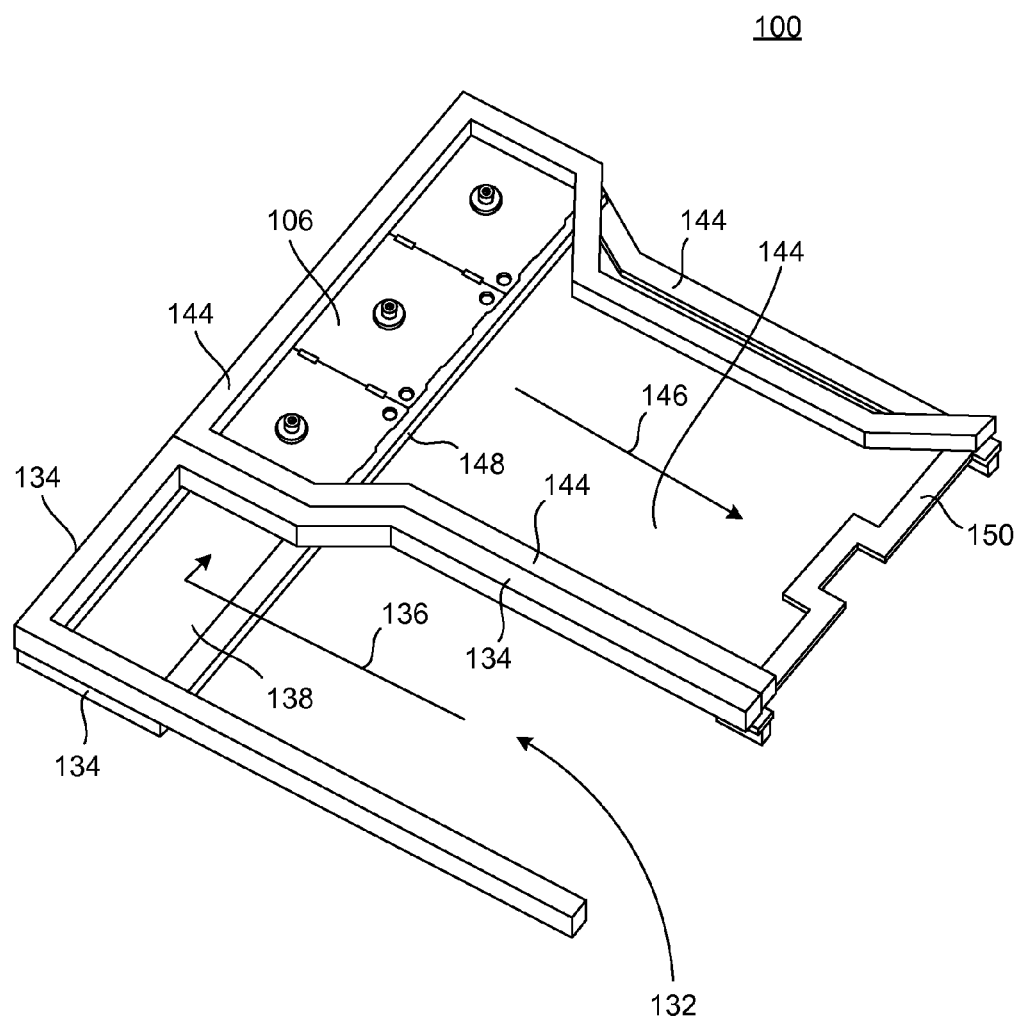

FIG. 1B is conceptual diagram illustrating the example system 100 of FIG. 1A including an internal structure of the computing device 102 for thermal management of the at least one processor 104 positioned in the computing device 102. For purposes of explanation, referring to FIG. 1A, the first cover portion 112 has been removed to reveal the internal structure of the computing device 102. Further, FIG. 1C is a conceptual diagram illustrating the example system 100 of FIGS. 1A-1B including sealing features of the internal structure of the computing device 102 for thermal management of at least one processor 104 positioned in the computing device 102.

In an implementation, the computing device 102 may include the at least one processor 104 positioned within the enclosure 110 of the computing device 102. As shown in FIG. 1B, the PCB portion 118 (e.g., MLB) is attached to the internal base portion 116 (e.g., Mylar sheet), and the internal base portion 116 (e.g., Mylar sheet) is attached to the second cover portion 114 (e.g., C-cover). The at least one processor 104 may be attached to the PCB portion 118 in a manner such that the at least one processor 104 is mechanically supported and electrically connected to the PCB portion 118. The at least one processor 104 may comprise a central processing unit (CPU) that may be configured to operate within a predetermined power range, such as, for example, 12 watts (W) or less. In other various implementations, the CPU may be adapted to operate within another predetermined power range, for example, above or below 12 W. In still other various implementations, the computing device 102 may include a plurality of processors 104 positioned within the enclosure 110 of the computing device 102, without departing from the scope of the disclosure.

In the example of FIG. 1B, the internal structure of the computing device 102 may be configured for drawing external fluid into the computing device 102 via an inlet aperture 130 with use of an active pump assembly 106 positioned within the enclosure 110. As described herein, the inlet aperture 130 may be adapted to pull or draw an external fluid, such as air, into the enclosure 110, over the PCB portion 118 (e.g., MLB), and toward the active pump assembly 106. In some implementations, the fluid may comprise at least one of a gas and a liquid including at least one of a coolant and a refrigerant. In an example, the fluid may comprise air.

In an implementation, the active pump assembly 106 may include one or more moveable membrane structures, the movement of which generates a pressurized fluid flow along a path from an inlet channel 132 to an outlet channel 142. In another implementation, at least one of the moveable membrane structures may be configured to lie in a plane that is substantially parallel to a direction of the path from the inlet channel 132 to the outlet channel 142, and movement of the at least one moveable membrane structure that may generate the pressurized fluid flow may be substantially perpendicular to the path. Further explanation and scope related to the active pump assembly 106 and the one or more membrane structures thereof is described herein.

In an implementation, the inlet aperture 130 may be formed as part of the enclosure 110 in the form of an opening, such as, for example, an elongated slot, as shown in FIG. 1B. The opening of the inlet aperture 130 may be in the form of any generally known geometric shape, such as, for example, a circle, oval, square, rectangle, triangle, etc. In an example, as shown in FIG. 1B, the inlet aperture 130 may be formed proximate to the hinge assembly 120 (e.g., hinge barrel) of the enclosure 110. In another example, the inlet aperture 130 may be formed as part of the hinge assembly 120 of the enclosure 110. In another example, the inlet aperture 130 may be formed within the hinge assembly 120 of the enclosure 110. In other examples, the inlet aperture 130 may be formed as part of the first cover portion 112 (e.g., D-cover) and/or the second cover portion 114 (e.g., C-cover) of the enclosure 110.

In an implementation, as shown in FIG. 1B, the active pump assembly 106 may be attached to the internal base portion 116 (e.g., Mylar sheet) in a manner such that the active pump assembly 106 is mechanically supported by the internal base portion 116 (e.g., Mylar sheet). In another implementation, the pump assembly 106 may be attached to another structural component of the enclosure 110, such as, for example, the second cover portion 114 (e.g., C-cover). The active pump assembly 106 may include a plurality of active pumps (e.g., 3 active pumps) for drawing external fluid into the enclosure 110 of the computing device 102 via the inlet aperture 130. In another implementation, it should be appreciated that the active pump assembly 106 may include at least one active pump for drawing external fluid into the enclosure 110 of the computing device 102 via the inlet aperture 130. In an example, the at least one active pump of the active pump assembly 106 may include one or more membrane or diaphragm structures to generate a pressurized fluid flow path within the enclosure 110 of the computing device 102. In another example, the at least one active pump of the active pump assembly 106 may include at least one piezo pump. Further explanation and scope of implementing the one or more membrane or diaphragm structures of the active pump assembly 120 is described in greater detail herein, e.g., in reference to FIGS. 1H-1 and 1H-2.

In the example of FIG. 1B, the internal structure of the computing device 102 may be configured with the inlet channel 132 formed within the enclosure 110 for directing the drawn fluid from the inlet aperture 130 through a first area or section 122 of the enclosure 110 to the active pump assembly 106. As shown in the FIG. 1B, the inlet channel 132 may be configured as an enclosed space within the first area 122 of the enclosure 110 having one or more interior walls 134, 138 that define an inlet fluid path 136 from the inlet aperture 130 through the first area 122 of the enclosure 110 to the active pump assembly 106.

In an implementation, referring to FIGS. 1B and 1C, the one or more interior walls 134, 138 of the inlet channel 132 that define the inlet fluid path 136 may include sealing features, such as, for example, one or more seals or gaskets comprising a sealing material, such as, for example, foam, rubber, urethane, or any other generally known sealing or gasketing material that may be suitable for implementing a seal formed between portions of the enclosure 110 including the first cover portion 112, the second cover portion 114, the internal base portion 116, the hinge assembly 120, and the active pump assembly 106. In an example, the seal may be configured to provide an air-tight seal to the inlet channel 132 so that the external fluid drawn into the inlet channel 132 may be efficiently directed along the inlet fluid path 136 from the inlet aperture 130 through the inlet channel 132 to the active pump assembly 106 without leaking from any part or portion of the enclosure 110.

In another implementation, referring to FIGS. 1B and 1C, the one or more interior walls 134, 138 may include a first part or section 134 (e.g., an upper part or section) and a second part or section 138 (e.g., a lower part or section). In an example, the inlet channel 132 directs or guides the drawn fluid from the inlet aperture 130 through the inlet fluid path 136 defined by the first part 134 of the interior walls 134, 138 to underneath the active pump assembly 106 defined by the second part 138 of the interior walls 134, 138 so that the drawn fluid is directed or guided through the active pump assembly 106. The second part 138 of the interior walls 134, 138 may be configured to provide a seal proximate to the active pump assembly 106 so that fluid passing from underneath the active pump assembly 106 does not leak from the inlet channel 132. As such, drawing the external fluid into the enclosure 110 may include passing the drawn fluid through the active pump assembly 106 to generate a pressurized fluid flow path from the inlet channel 132 to the outlet channel 142.

In an example, as provided herein, the active pump assembly 106 may include one or more active pumps (e.g., one or more piezo pumps) with each having one or more moveable membranes or diaphragms, the movement of which may be configured to generate a pressurized fluid flow along a path from the inlet channel 132 to the outlet channel 142. In another example, at least one of the moveable membranes or diaphragms lies in a plane that may be substantially parallel to a direction of the path from the inlet channel 132 to the outlet channel 142, and movement of the at least one membrane or diaphragm that is configured to generate the pressurized fluid flow may be substantially perpendicular to the path from the inlet channel 132 to the outlet channel 142.

In the example of FIG. 1B, the internal structure of the computing device 102 may be configured with the outlet channel 142 formed within the enclosure 110 for directing the drawn fluid from the active pump assembly 106 through a second area or section 124 of the enclosure 110 to an outlet aperture 140 for thereby passing the drawn fluid over the at least one processor 104 positioned in the second area 124 of the enclosure 110. As shown in the FIG. 1B, the outlet channel 142 may be configured as an enclosed space within the second area 142 having one or more interior walls 144, 148 that define an outlet fluid path 146 from the active pump assembly 106 through the second area 124 of the enclosure 110 to the outlet aperture 140.

In an implementation, referring to FIGS. 1B and 1C, the one or more interior walls 144, 148 of the outlet channel 142 that define the outlet fluid path 142 may include sealing features, such as, for example, one or more seals or gaskets comprising a sealing material, such as, for example, foam, rubber, urethane, or any other generally known sealing or gasketing material that may be suitable for implementing a seal formed between portions of the enclosure 110 including the first cover portion 112, the second cover portion 114, the internal base portion 116, the hinge assembly 120, and the active pump assembly 106. In an example, the interior walls 144 that form a seal or gasket, which may be referred to as a top seal or gasket, may be configured to provide an air-tight seal to the outlet channel 142 so that the external fluid drawn into the outlet channel 142 may be efficiently directed along the outlet fluid path 146 from the active pump assembly 106 through the outlet channel 142 to the outlet aperture 140 without leaking from any part or portion of the enclosure 110.

In another implementation, referring to FIGS. 1B and 1C, the one or more interior walls 144, 148 may include a first part or section 144 (e.g., an upper part or section) and a second part or section 148 (e.g., a lower part or section). In an example, the outlet channel 142 directs or guides the drawn fluid from top of the active pump assembly 106 through the outlet fluid path 146 defined by the first part 144 of the interior walls 144, 148 to the outlet aperture 140 so that the drawn fluid is directed or guided from the active pump assembly 106 through the outlet channel 142 and expelled or exhausted from the enclosure 110 via the outlet aperture 140. The second part 148 of the interior walls 144, 148 may be configured to provide a seal proximate to the active pump assembly 106 so that fluid passing from the top of the active pump assembly 106 does not leak from the outlet channel 142. As such, expelling or exhausting the drawn fluid from the enclosure 110 may include passing the drawn fluid through the active pump assembly 106 to generate a pressurized fluid flow path from the inlet channel 132 to the outlet channel 142. Further, expelling or exhausting the drawn fluid from the enclosure 110 of the computing device 102 via the outlet aperture 140 with use of the active pump assembly 106 may occur after passing the drawn fluid over the at least one processor 104 positioned in the outlet channel 142 along the outlet fluid path 146 so as to provide thermal management of the at least one processor 104.

In an implementation, it should be appreciated that the second part 138 of the interior walls 134, 138 and the second part 148 of the interior walls 144, 148 may be integrated as a single part (e.g., a single seal or gasket) to provide sealing or gasketing proximate to the active pump assembly 106 so that fluid does not leak from the inlet channel 132, the outlet channel 142, and/or any part of the enclosure 110.

In an implementation, referring to FIG. 1C, the sealing features of the internal structure of the computing device 102 may include one or more additional seals or gaskets comprising a sealing material, such as, for example, foam, rubber, urethane, or any other generally known sealing or gasketing material that may be suitable for implementing an additional seal or gasket 150 formed between portions of the enclosure 110 including the first cover portion 112, the second cover portion 114, the internal base portion 116, the hinge assembly 120, and the active pump assembly 106.

In an implementation, the additional seal or gasket 150 may be formed between the PCB portion 118 (e.g., MLB) and the internal base portion 116 (e.g., Mylar sheet) so as to form an alternate inlet path underneath the PCB portion 118 (e.g., MLB) to underneath the active pump assembly 106. Further scope of the additional seal or gasket 150 is described herein in reference to FIGS. 1E and 1F.

In the example of FIG. 1B, the internal structure of the computing device 102 may be configured for expelling the drawn fluid from the computing device 102 via the outlet aperture 140 with use of the active pump assembly 106 positioned within the enclosure 110 after passing the drawn fluid over the at least one processor 104 so as to provide thermal management of the at least one processor 104. As described herein, the outlet aperture 140 may be adapted to expel or exhaust the drawn fluid, such as air, from the enclosure 110 after the fluid passes over the PCB portion 118 (e.g., MLB) and the at least one processor 104 with use of the active pump assembly 106.

In an alternate implementation, it should be appreciated that the at least one processor 104 may be positioned in the inlet channel 132 such that external fluid may be drawn into the inlet channel 132 via the inlet aperture 130 and passed over the at least one processor 104 in the inlet channel 132 prior to entering and passing through the pump assembly 106, without departing from the scope of the disclosure.

In an implementation, the outlet aperture 140 may be formed as part of the enclosure 110 in the form of an opening, such as, for example, an elongated slot, as shown in FIG. 1B. The opening of the outlet aperture 140 may be in the form of any generally known geometric shape, such as, for example, a circle, oval, square, rectangle, triangle, etc. In an example, the outlet aperture 140 may be formed proximate to the hinge assembly 120 of the enclosure 110. In another example, the outlet aperture 140 may be formed as part of the hinge assembly 120 of the enclosure 110. In another example, the outlet aperture 140 may be formed within the hinge assembly 120 of the enclosure 110. In other examples, the outlet aperture 140 may be formed as part of the first cover portion 112 and/or the second cover portion 114 of the enclosure 110.

In the example of FIG. 1B, the inlet and outlet channels 132, 142 each respectively include an enclosed space within the first and second areas 122, 124 of the enclosure 110 with each respectively having the one or more interior walls 134, 138, 144, 148 that respectively define the inlet and outlet fluid paths 136, 146. In an implementation, drawing the external fluid into the enclosure 110 may include passing the drawn fluid through the active pump assembly 106 to generate a pressurized fluid flow path 136, 146, respectively, from the inlet channel 132 to the outlet channel 142.

In another implementation, passing the drawn fluid over the at least one processor 104 may include forcing the drawn fluid over the at least one processor 104 by regulating the course of the drawn fluid through the outlet channel 142 formed within the enclosure 110 of the computing device 102. In still another implementation, passing the drawn fluid over the at least one processor 104 may include using the active pump assembly 106 to impinge the drawn fluid onto the at least one processor 104 by forcibly guiding the drawn fluid through the outlet channel 142 formed within the enclosure 110 of the computing device 102.

In an implementation, each active pump in the active pump assembly 106 may include one or more membrane structures to generate the pressurized fluid flow path 136, 146 from the inlet channel 132 to the outlet channel 142. For instance, an active pump may refer to a reciprocating-type pump configured to cause fluid, such as air, to flow using one or more oscillating membranes (e.g., diaphragms). Reciprocating-type pumps or membrane-type pumps may be referred to as positive displacement pumps that use reciprocating action of a flexible membrane or diaphragm and suitable non-return suction and discharge valves to pump a fluid, such as air. The membrane or diaphragm may be formed of a flexible and yet high-strength material, such as, for example, rubber, plastic, polymer, etc. Membrane-type pumps having a piezo element may be powered by electricity for electro-mechanical displacement of fluid including air.

In an implementation, each active pump in the active pump assembly 106 may include at least one piezo pump. In an example, piezo-type pumps use one or more oscillating membranes (e.g., diaphragms) driven by a piezoelectric element configured to expand and contract with applied electricity. Thus, in an example, a piezo-type pump may be referred to as a type of reciprocating-type pump or membrane-type pump.

In various implementations, the fluid may include at least one of a gas and a liquid including at least one of a coolant, a refrigerant, and air. The external fluid may have a temperature of at least less than a temperature of the at least one processor 104.

It should be appreciated that, although not shown in the drawings, the enclosure 110 may include at least one of a heat pipe assembly, a fin assembly, and a fan assembly that uses forced convection to dissipate heat from the at least one processor 104 of the computing device 102. It should further be appreciated that, although not shown in the drawings, the enclosure 110 may include one or more heat pipes, fins, and fans as an assembly that uses forced convection to dissipate heat from the at least one processor 104 through the one or more heat pipes into the fins that may be connected to the fans to assist with reducing temperature of the at least one processor 104.

Figure 1D:
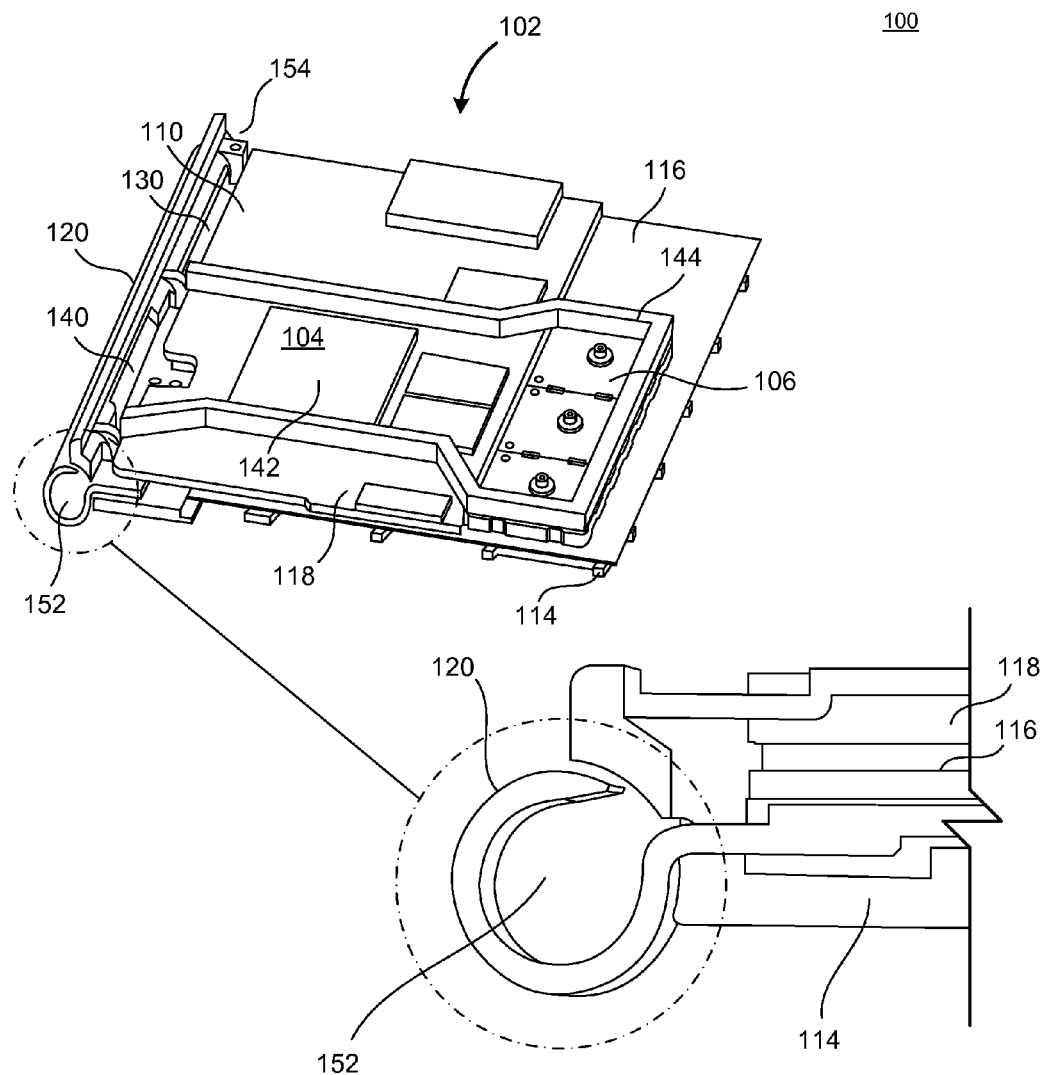

FIG. 1D is conceptual diagram illustrating the example system 100 of FIGS. 1A-1C including the hinge assembly 120 of the enclosure 110 and the internal structure of the computing device 102 for thermal management of at least one processor 104 positioned in the computing device 102. Referring to FIG. 1D, the example system 100 is shown with only the one or more interior walls 144, 148 that define the outlet fluid path 146 from the active pump assembly 106 through the outlet channel 142 of the enclosure 110 to the outlet aperture 140.

In an implementation, the outlet aperture 140 may be formed within the hinge assembly 120 of the enclosure 110. As shown in FIG. 1D, the hinge assembly 120 may include a first hinge opening 152 formed in a first end portion of the hinge assembly 120. The hinge assembly 120 may include a hollow region formed within the hinge assembly 120, wherein the hinge opening 152 may be configured to provide at least one opening to the hollow region of the hinge assembly 120.

In another implementation, the inlet and outlet apertures 130, 140 may be formed within the hinge assembly 120 of the enclosure 110. The hinge assembly 120 may include the first hinge opening 152 formed in the first end portion of the hinge assembly 120, and the hinge assembly 120 may include a second hinge opening 154 formed in a second end portion of the hinge assembly 120, that is opposite the first end portion. The hinge openings 152, 154 may be configured to provide a plurality of openings to the hollow region of the hinge assembly 120. The hinge assembly 120 may include an internal partition formed in the hollow region of the hinge assembly 120 to provide separate hollow regions for the hinge openings 152, 154 formed in the end portions of the hinge assembly 120.

In an implementation, referring to the embodiment of FIG. 1B, external fluid may be drawn into the hollow region of the hinge assembly 120 via the second hinge opening 154 with use of the active pump assembly 106 positioned within the enclosure 110, and the drawn fluid may be further drawn into the enclosure 110 of the computing device 102 via the inlet aperture 130 with use of the active pump assembly 106 positioned within the enclosure 110. As such, in an example, the inlet fluid path 136 may be further defined as an external fluid inlet flow in through the second hinge opening 154, through the hollow region formed in the hinge assembly 120, through the inlet aperture 130, through the inlet channel 132, and to the active pump assembly 106.

In an implementation, the drawn fluid may be expelled from the enclosure 110 via the outlet aperture 140 with use of the active pump assembly 106 positioned within the enclosure 110, and the drawn fluid may be further expelled from the enclosure 110 via the hollow region and the first hinge opening 152 of the hinge assembly 120 with use of the active pump assembly 106 positioned within the enclosure 110. As such, in an example, the outlet fluid path 146 may be further defined as a drawn fluid outlet flow from the inlet channel 132, through the active pump assembly 106, through the outlet channel 142, through the outlet aperture 140, through the hollow region formed in the hinge assembly 120, and out through the first hinge opening 152.

In an implementation, fluid that may be at a lower temperature than the at least one processor 104 positioned in the enclosure 110 may be drawn into the enclosure 110 via the second hinge opening 154 and the inlet aperture 130, passed over the at least one processor 104, and expelled from the enclosure 110 of the computing device 102 via the outlet aperture 140 and the first hinge opening 152 with use of the active pump assembly 106 so as to provide thermal management of the at least one processor 104.

In an implementation, the hollow region of the hinge assembly 120 may be adapted to promote cooling of the computing device 102 including the at least one processor 104, while simultaneously keeping the venting mechanism (e.g., the inlet and outlet apertures 130, 140) hidden from view. The active pump assembly 106 within the enclosure 110 may be configured to exhaust heated air through the outlet aperture 140, which may be formed in the hinge assembly 120, and further directed to pass through the hollow region of the hinge assembly 120. In an example, the heated exhaust air may circulate within the hollow region of the hinge assembly 120 and transfer heat to an outer wall of the hinge assembly 120. In some instances, the transferred heat may heat the barrel of the hinge assembly 120 to a temperature above an ambient temperature of a proximate environment of the apparatus. Heat transferred to the hinge barrel wall of the hinge assembly 120 may be radiated away from the hinge barrel and into the environment around the computing device 102. The configuration of the active pump assembly 106, the outlet aperture 140, and the hinge barrel of the hinge assembly 120 of the computing device 102 may be arranged to promote the transfer of heat from the air exhausted from the active pump assembly 106 to the hinge barrel of the hinge assembly 120, so that the hinge barrel may radiate the exhausted heat into the environment around the computing device 102. The configuration of the active pump assembly 106, the outlet aperture 140, and the hinge barrel of the hinge assembly 120 may be arranged so that the outlet aperture 140 is not visible to a user from outside the computing device 102. By hiding the outlet aperture 140, an appealing and sleek outer design of the computing device 102 may be provided to the user.

In an implementation, an inner surface of the hinge barrel of the hinge assembly 120 may include one or more metal fins (not shown) that extend substantially perpendicular to the inner surface to increase the surface area of the hinge barrel wall that heated exhaust air may contact, so that the hinge barrel wall efficiently absorbs heat from the exhausted air. In some implementations, an outer barrel wall of the hinge assembly 120 may include a plurality of fins (not shown) extending substantially perpendicular to the outer surface to increase the surface area of the hinge barrel wall, so that the hinge barrel may efficiently radiate heat into the environment surrounding the computing device 102. In some implementations, the inner and/or the outer surface of the hinge barrel wall may be contoured and/or textured to increase the surface area so that the inner surface may efficiently absorb heat from the exhaust air or so that the outer surface may efficiently radiate heat from the hinge barrel into the surrounding environment.

In some implementations, the air that is exhausted by the active pump assembly 106 into the inner hollow region of the hinge assembly 120 may be directed toward the inner hollow region in a direction that has a component parallel to the longitudinal axis of the hinge assembly 120. For example, the active pump assembly 106 may be configured to exhaust air in such a direction. Then, when the air circulates within the hollow region of the hinge assembly 120, the circulating air may travel down the length of the hinge assembly 120 and flow out of an opening (e.g., the first hinge opening 152 of FIG. 1D) formed at an end of the hinge assembly 120 and into the environment surrounding the computing device 102. In another example, air that is exhausted by the active pump assembly 106 may not pass through the hollow region of the hinge assembly 120 but rather may pass thorough a gap formed between the hinge assembly 120 and a frame member of the enclosure 110 to exhaust heat into the environment surrounding the computing device 102.

Figure 1E:
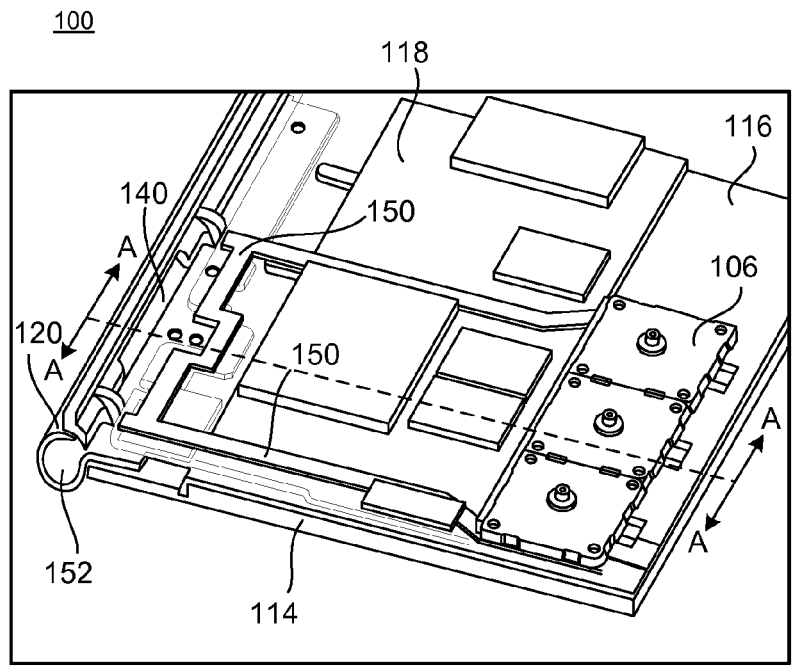
Figure 1F:
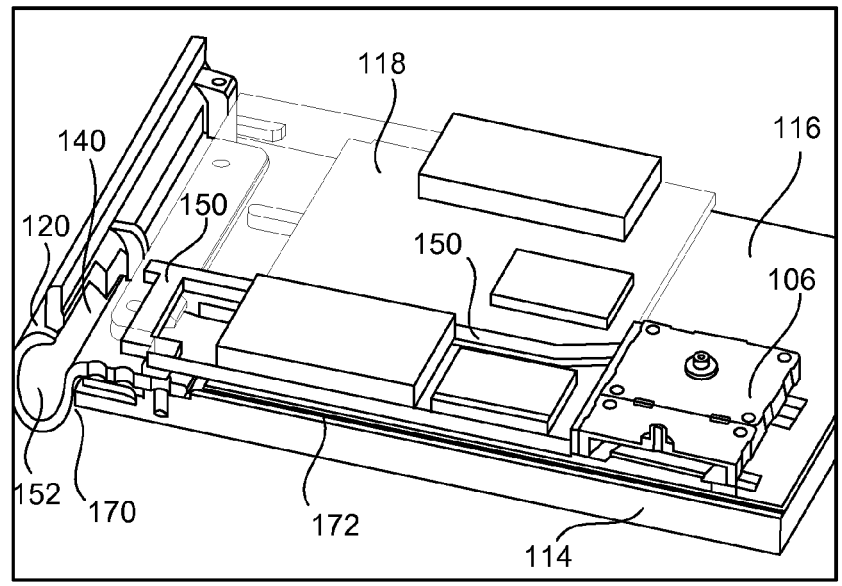

FIG. 1E is conceptual diagram illustrating the example system 100 of FIGS. 1A-1C including an alternate inlet 170 positioned proximate to the hinge assembly 120 of the enclosure 110 with an alternate inlet channel 172 and the internal structure of the computing device 102 for thermal management of at least one processor 104 positioned in the computing device 102. FIG. 1F is conceptual diagram illustrating a cut-away of the example system 100 of FIG. 1E taken along the line A-A.

In an implementation, as shown in FIGS. 1E-1F, the additional seal or gasket 150 may be formed between the PCB portion 118 (e.g., MLB) and the internal base portion 116 (e.g., Mylar sheet) so as to form an alternate inlet path via the alternate inlet channel 172 underneath the PCB portion 118 (e.g., MLB) to underneath the active pump assembly 106. The additional seal or gasket 150 may be referred to as an inlet seal or gasket, without departing from the scope of the disclosure.

In an implementation, the alternate inlet 170 may comprise a gap formed between the second cover portion 114 (e.g., C-cover) and the hinge assembly 120 (e.g., hinge barrel). As shown in FIG. 1F, external fluid (e.g., air) may be drawn into the enclosure 110 by entering through the alternate inlet 170 (i.e., gap) formed between the second cover portion 114 (e.g., C-cover) and the hinge assembly 120 (e.g., hinge barrel). The drawn fluid entering the enclosure 110 may be directed toward the active pump assembly 106 by traveling between the PCB portion 118 (e.g., MLB) and the internal base portion 116 (e.g., Mylar sheet). The drawn fluid may enter the active pump assembly 106 from underneath the active pump assembly 150.

In an implementation, as described in reference to FIG. 1D, the drawn fluid may be expelled from the enclosure 110 via the outlet aperture 140 with use of the active pump assembly 106 positioned within the enclosure 110, and the drawn fluid may be further expelled from the enclosure 110 via the hollow region and the first hinge opening 152 of the hinge assembly 120 with use of the active pump assembly 106 positioned within the enclosure 110. As such, in an example, the outlet fluid path 146 may be further defined as a drawn fluid outlet flow from the inlet channel 132, through the active pump assembly 106, through the outlet channel 142, through the outlet aperture 140, through the hollow region formed in the hinge assembly 120, and out through the first hinge opening 152.

In an implementation, fluid that may be at a lower temperature than the at least one processor 104 positioned in the enclosure 110 may be drawn into the enclosure 110 via the alternate inlet 170, through the alternate inlet channel 172, through the active pump assembly 106, through the outlet channel 142, passed over the at least one processor 104, and expelled from the enclosure 110 of the computing device 102 via the outlet aperture 140 and the first hinge opening 152 with use of the active pump assembly 106 so as to provide thermal management of the at least one processor 104.

Figure 1G:
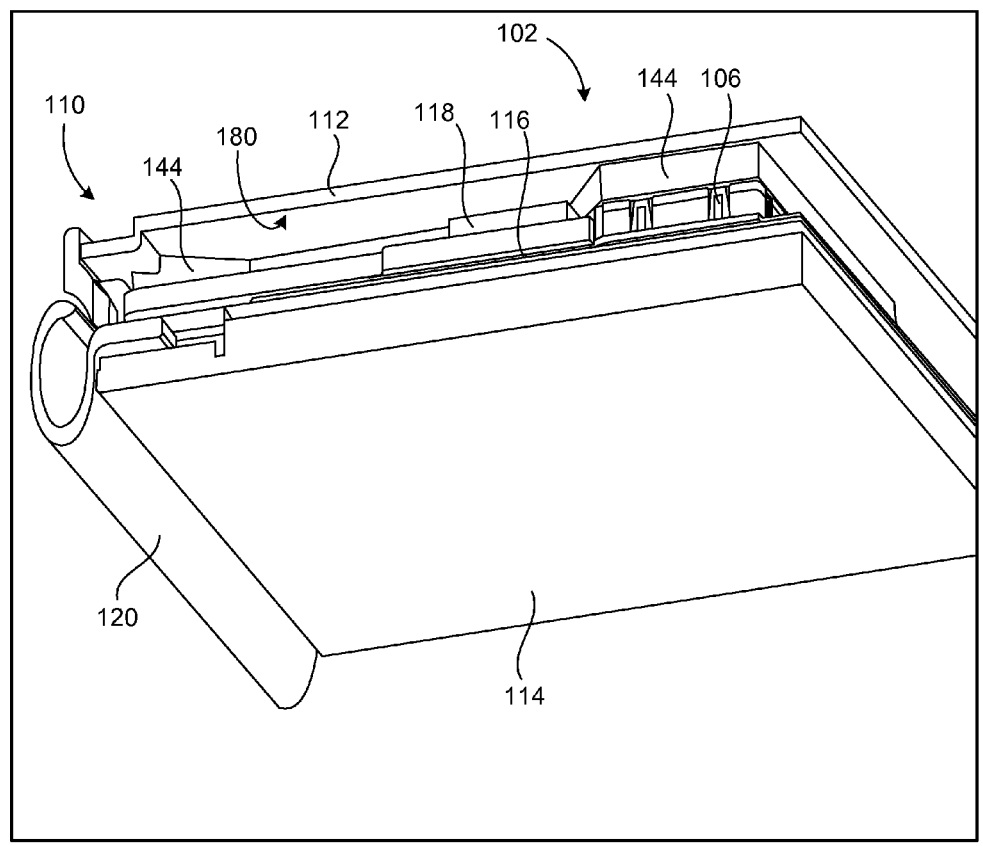

FIG. 1G is conceptual diagram illustrating the example system 100 of FIGS. 1A-1B including a side view of the internal structure of the enclosure 110 of the computing device 102 for thermal management of at least one processor 104 positioned in the computing device 102. In various implementations, one or more fluid flow features, dampening features, baffles, and/or films may be added to an inside surface 180 of the first cover portion 112 (e.g., D-cover) to assist with directing or guiding fluid flow within the enclosure and/or to assist with lowering noise emanating from the enclosure 110 of the computing device 102. In an example, the features, baffles, and/or films may be formed from molded plastic, polymer, or any other type of similar material. In other examples, the geometry of the features, baffles, and/or films may be adapted to improve cooling effects and/or lower sound pressure levels of the at least one processor 104 and/or the active pump assembly 106.

Figures 1, 1H:
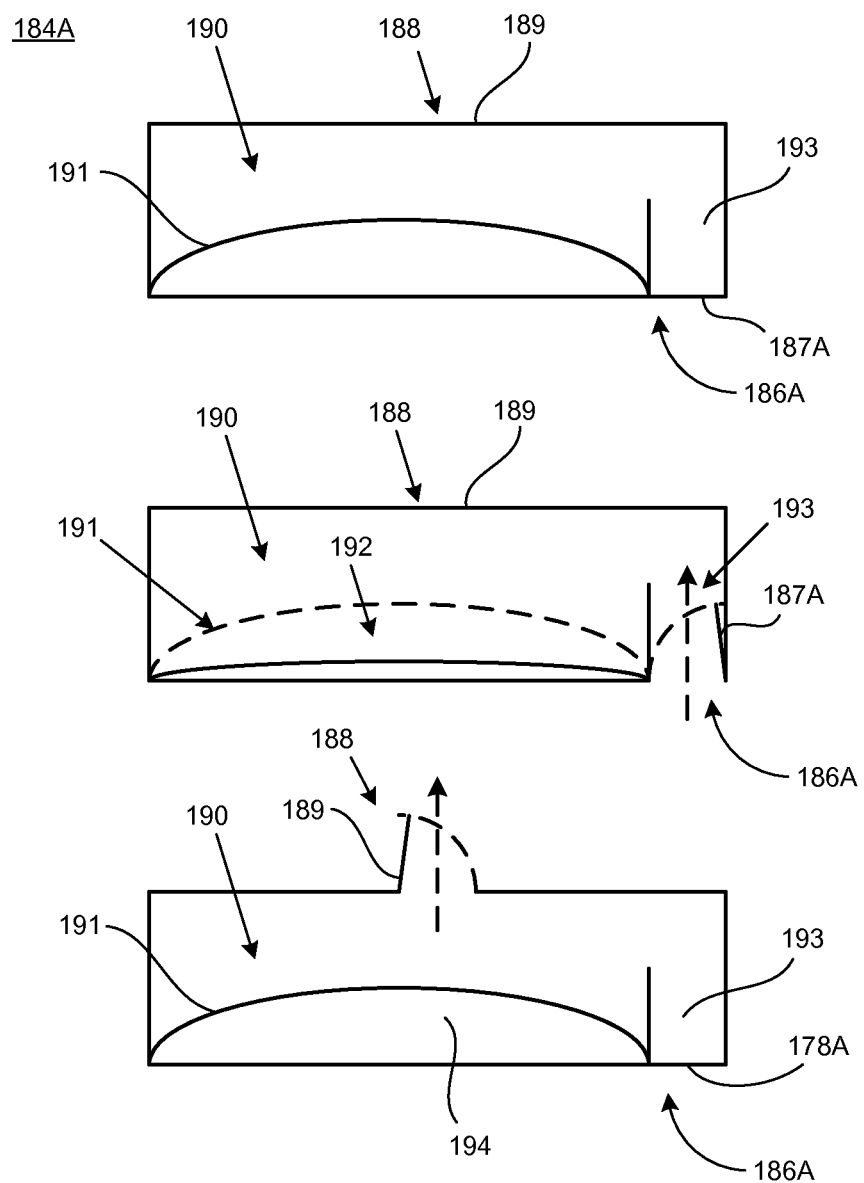
FIGS. 1H-1 and 1H-2 are diagrams illustrating example configurations of active pumps for an active pump assembly.
Figure 1H:
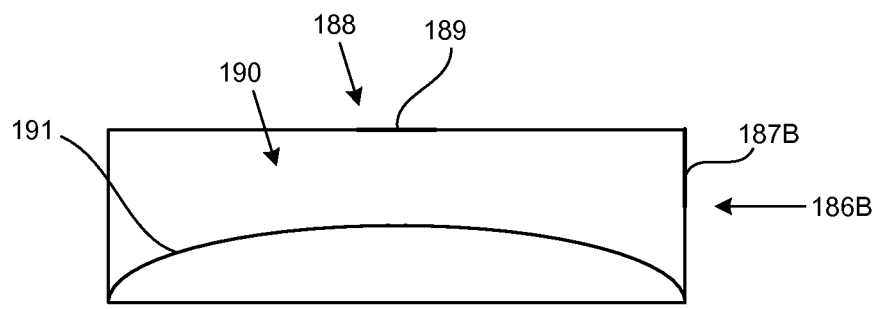
Figure 1:
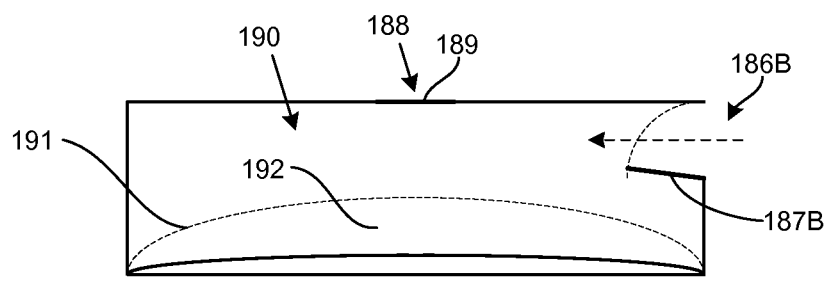
Figure 2:
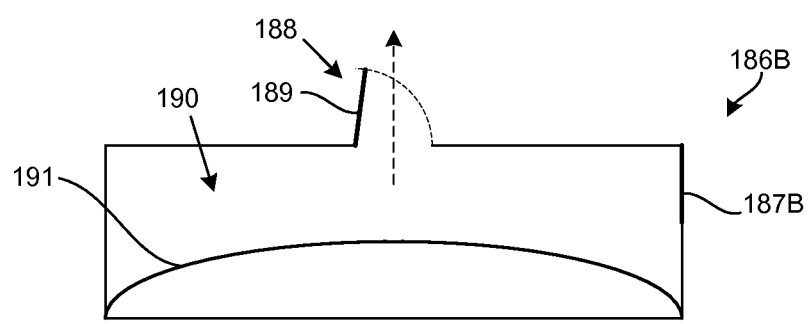
Figure 2:
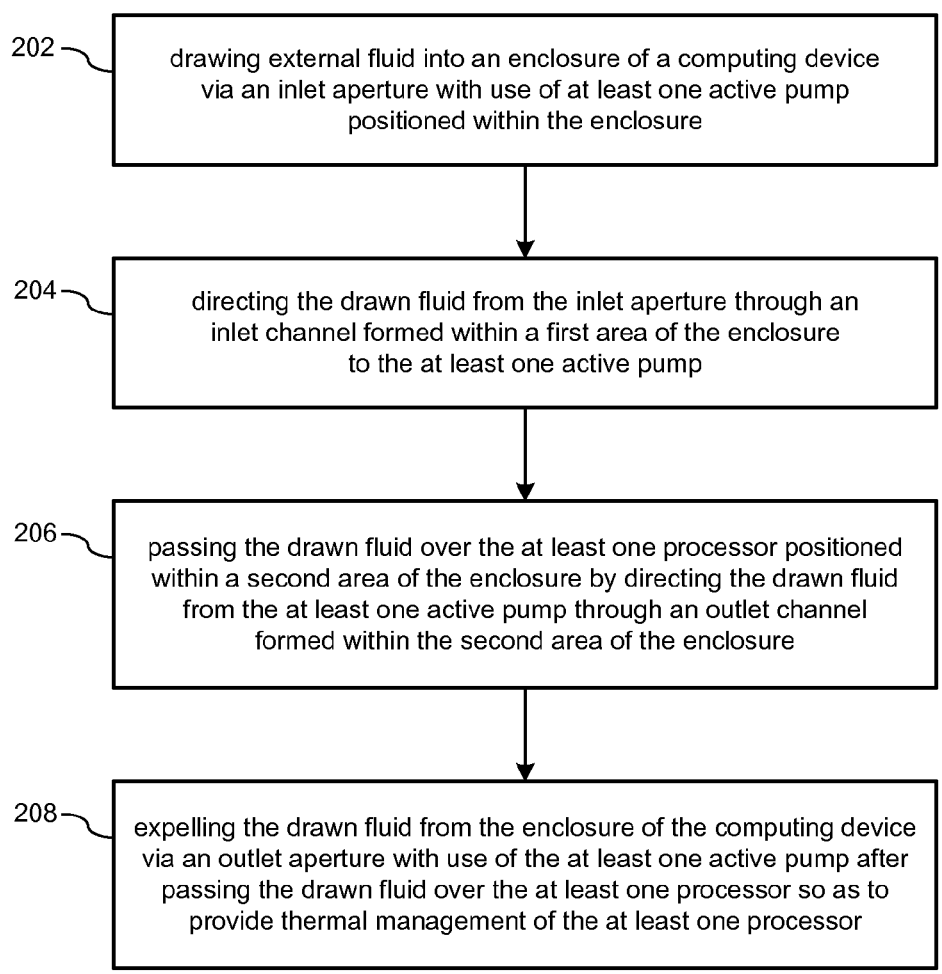

FIGS. 1H-1 and 1H-2 are diagrams illustrating example configurations of active pumps 184A, 184B for the active pump assembly 120 including a side view of an internal structure of the active pumps 184A, 184B for movement of fluid through the enclosure 110 of the computing device 102. In particular, FIG. 1H-1 shows a side view of a configuration for a first active pump 184A having an inlet port 186A and an inlet valve 187A positioned adjacent a side of the first active pump 184A to thereby draw in fluid, such as air, from underneath the active pump assembly 120, and FIG. 1H-2 shows a side view of a configuration for a second active pump 184B having an inlet port 186B and an inlet valve 187B positioned adjacent a side of the second active pump 184B to thereby draw in fluid, such as air, from a side of the active pump assembly 120.

FIG. 1H-1 shows a side view of the configuration of the first active pump 184A including the inlet port 186A and the inlet valve 187A positioned adjacent a lower side of the first active pump 184A to thereby draw in fluid into a pump chamber 190 of the first active pump 184A from underneath the active pump assembly 120 via the inlet port 186A by opening of the inlet valve 187A and passing through an inlet channel 193 into the pump chamber 190. As shown in FIG. 1H-1, the configuration of the first active pump 184A may include an outlet port 188 and an outlet valve 189 positioned adjacent an upper side of the first active pump 184A to thereby expel or exhaust fluid from the pump chamber 190 via the outlet port 188 by opening of the outlet valve 189 so as to expel or exhaust the fluid from a top portion of the active pump assembly 120.

In an implementation, the first active pump 184A may include at least one moveable membrane or diaphragm structure 190, the movement of which may be configured to generate a pressurized fluid flow path from the inlet port 186A to the outlet port 188. As shown in FIG. 1H-1, the moveable membrane or diaphragm structure 190 may be positioned adjacent to a lower portion of the first active pump 184A.

As shown in FIG. 1H-1, the inlet valve 186A of the inlet port 186A may be configured to open inward when the moveable membrane or diaphragm structure 190 contracts 192 to draw fluid into the pump chamber 190 from outside the first active pump 184A, and the outlet port 188 may be configured to open outward when the moveable membrane or diaphragm structure 190 expands 194 to expel or exhaust from the pump chamber 190 to outside of the first active pump 184A.

In an example, as further shown in FIG. 1H-1, the moveable membrane or diaphragm structure 190 may be configured to move and contract 192 thereby increasing the volume of the pump chamber 190, and the inlet valve 187A of the inlet port 186A may be configured to open while the outlet valve 189 of the outlet port 188 may be configured to close to allow the drawing in of fluid into the pump chamber 190 from outside of the first active pump 184A.

In another example, as further shown in FIG. 1H-1, the moveable membrane or diaphragm structure 190 may be configured to move and expand 194 thereby decreasing the volume of the pump chamber 190, and the inlet valve 187A of the inlet port 186A may be configured to close while the outlet valve 189 of the outlet port 188 may be configured to open to allow the expelling or exhausting of fluid out from the pump chamber 190 to outside of the first active pump 184A.

FIG. 1H-2 shows a side view of the configuration of the second active pump 184B including the inlet port 186B and the inlet valve 187B positioned adjacent a side of the second active pump 184B to thereby draw in fluid into the pump chamber 190 of the second active pump 184B from a side of the active pump assembly 120 via the inlet port 186B by opening of the inlet valve 187B into the pump chamber 190. As shown in FIG. 1H-2, the configuration of the second active pump 184B may include the outlet port 188 and the outlet valve 189 positioned adjacent the upper side of the second active pump 184B to thereby expel or exhaust fluid from the pump chamber 190 via the outlet port 188 by opening of the outlet valve 189 so as to expel or exhaust the fluid from the top portion of the active pump assembly 120.

In an implementation, the second active pump 184B may include at least one moveable membrane or diaphragm structure 190, the movement of which may be configured to generate a pressurized fluid flow path from the inlet port 186B to the outlet port 188. As shown in FIG. 1H-2 the moveable membrane or diaphragm structure 190 may be positioned adjacent to a lower portion of the second active pump 184B.

As shown in FIG. 1H-2, the inlet valve 186B of the inlet port 186B may be configured to open inward when the moveable membrane or diaphragm structure 190 contracts 192 to draw fluid into the pump chamber 190 from outside the second active pump 184B, and the outlet port 188 may be configured to open outward when the moveable membrane or diaphragm structure 190 expands 194 to expel or exhaust from the pump chamber 190 to outside of the second active pump 184B.

In an example, as further shown in FIG. 1H-2, the moveable membrane or diaphragm structure 190 may be configured to move and contract 192 thereby increasing the volume of the pump chamber 190, and the inlet valve 187B of the inlet port 186B may be configured to open while the outlet valve 189 of the outlet port 188 may be configured to close to allow the drawing in of fluid into the pump chamber 190 from outside of the second active pump 184B.

In another example, as further shown in FIG. 1H-2, the moveable membrane or diaphragm structure 190 may be configured to move and expand 194 thereby decreasing the volume of the pump chamber 190, and the inlet valve 187B of the inlet port 186B may be configured to close while the outlet valve 189 of the outlet port 188 may be configured to open to allow the expelling or exhausting of fluid out from the pump chamber 190 to outside of the second active pump 184B.

In various implementations, it should be appreciated that the inlet and outlet ports 186A, 186B, 188 may be positioned adjacent or in any sidewall of the active pumps 184A, 184B, without departing from the scope of the disclosure. It should also be appreciated that the moveable membrane or diaphragm structure 190 may be positioned in the pump chamber 190 and adjacent to any sidewall of the active pumps 184A, 184B, without departing from the scope of the disclosure. Further, it should be appreciated that the illustrated implementations refer to examples and should not be considered to be sole implementations of the disclosure. As such, other various implementations may include additional structures, such as one or more additional moveable membrane or diaphragm structures, fluid flow channels, and inlet and outlet ports and valves, without departing from the scope of the disclosure.

FIG. 2 is a process flow illustrating an example method 200 for thermal management of the at least one processor 104 in the computing device 102, as described in reference to FIGS. 1A-1G. In the example of FIG. 2, operations 202-208 are illustrated as discrete operations occurring in sequential order. However, it should be appreciated that, in other implementations, two or more of the operations 202-208 may occur in a partially or completely overlapping or parallel manner, or in a nested or looped manner, or may occur in a different order than that shown. Further, additional operations, that may not be specifically illustrated in the example of FIG. 2, may also be included in some implementations, while, in other implementations, one or more of the operations 202-208 may be omitted.

At 202, the method 200 may include drawing external fluid into the enclosure 110 of the computing device 102 via the inlet aperture 130 with use of at least one active pump 106 positioned within the enclosure 110. In an implementation, drawing the external fluid into the enclosure 110 may include passing the drawn fluid through the at least one active pump 106 to generate a pressurized fluid flow path from the inlet channel 132 to the outlet channel 142. The at least one active pump 106 is part of the active pump assembly and may include one or more membrane structures to generate a pressurized fluid flow path from the inlet channel 132 to the outlet channel 142. The at least one active pump 106 may comprise at least one piezo pump. In an implementation, the fluid may comprise at least one of a gas and a liquid including at least one of a coolant, a refrigerant, and air. The external fluid may have a temperature of at least less than a temperature of the at least one processor 104.

At 204, the method 200 may include directing the drawn fluid from the inlet aperture 130 through the inlet channel 132 formed within the first area 122 of the enclosure 110 to the at least one active pump 106. In an implementation, the inlet channel 132 may comprise an enclosed space within the first area 122 having interior walls 134, 138 that define the inlet fluid path 136. The inlet aperture 130 may be formed within or at least proximate to the hinge assembly 120 of the enclosure 110 of the computing device 102.

At 206, the method 200 may include passing the drawn fluid over the at least one processor 104 positioned within the second area 124 of the enclosure 110 by directing the drawn fluid from the at least one active pump 106 through the outlet channel 142 formed within the second area 124 of the enclosure 110. In an implementation, passing the drawn fluid over the at least one processor 104 may include forcing the drawn fluid over the at least one processor 104 by regulating the course of the drawn fluid through the outlet channel 142 formed within the enclosure 110 of the computing device 102. In another implementation, passing the drawn fluid over the at least one processor 104 may include using the at least one active pump 106 to impinge the drawn fluid onto the at least one processor 104 by forcibly guiding the drawn fluid through the outlet channel 142 formed within the enclosure 110 of the computing device 102.

At 208, the method 200 may include expelling the drawn fluid from the enclosure 110 of the computing device 102 via the outlet aperture 140 with use of the at least one active pump 106 after passing the drawn fluid over the at least one processor 104 so as to provide thermal management of the at least one processor 104. In an implementation, the channel 142 may comprise an enclosed space within the second area 124 having interior walls 144, 148 that define the outlet fluid path 146. The outlet aperture 140 may be formed within or at least proximate to the hinge assembly 120 of the enclosure 110 of the computing device 102.

In an aspect of the disclosure, processors such as high performance CPUs in portable computing devices such as laptops, notebooks, etc. may need large heatsinks and fans for thermal management of the internal processors to ensure efficient operation and reliability. These components may use substantial volume within portable computing devices, which may lead to thicker or larger enclosures to accommodate. By using piezo pumps, for example, the active pump assembly 106 may be configured to pull or draw in cooler air from outside the enclosure 110 and force the drawn air over the at least one processor 104 (e.g., CPU) for a cooling effect. This embodiment of the disclosure may need approximately 70% less volume than a conventional cooling means and may be highly customized for each enclosure design. In various implementations, different piezo elements may be used, membrane structures may be built or formed to provide a desired or needed air flow, and a size, shape, and/or configuration of an inlet and outlet may be varied to accommodate desirable parameters and/or characteristics. Piezo pumps are not typically affected by back pressure and/or the size of the inlet and outlet openings.

Further, in other various implementations, embodiments of the disclosure may use heat pipes, fins, and/or fan configurations for providing forced convection to cool the CPU by moving heat from the CPU through the heat pipe into the fins that are connected to the fan for cooling. Other implementations may use one or more piezo blowers to directly impinge air onto the CPU for cooling. However, this implementation may use internal "stagnant" air that may be ~15° C. above normal air temperature. As such, embodiments of the disclosure provide for pulling or drawing in external air that may be cooler than air inside the computing device 102, which may be more efficient in expelling or exhausting heat rather than just using internal air only.

Figure 3:
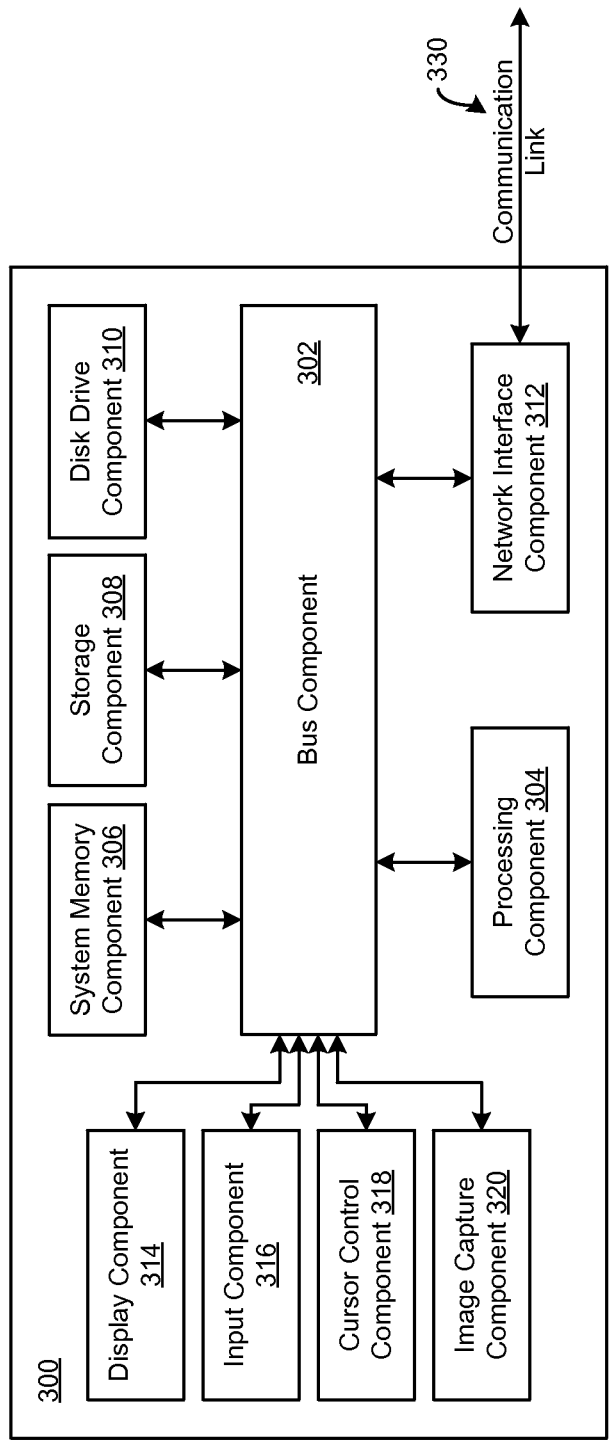
FIG. 3 is a block diagram illustrating an example computer system suitable for implementing embodiments of the disclosure.

FIG. 3 is a block diagram illustrating an example computer system 300 suitable for implementing embodiments of the disclosure, including the computing device 102. For instance, the computing device 102 may be implemented using any appropriate combination of hardware and/or software configured for interfacing with a user including a user device, a user interface (UI) device, a user terminal, a client device, or a customer device. The computing device 300 may be implemented as a portable computing device, such as, for example, a laptop computer. The computing device 102 may be implemented as some other type of portable computing device adapted for interfacing with a user, such as, for example, a PDA, a notebook computer, or a tablet computer. The computing device 102 may be implemented as some other type of computing device adapted for interfacing with a user, such as, for example, a PC. The computing device 102 may be implemented as a portable communication device (e.g., a mobile phone, a smart phone, a wireless cellular phone, etc.) adapted for interfacing with a user and for wireless communication over a network including a mobile communications network.

The computer system 300 (e.g., computing device 102) may be configured to wirelessly communicate with a network server over a network via a communication link 330 established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, the computer system 300 may include a bus 302 or other communication mechanism for communicating information, which interconnects subsystems and components, such as, for example, at least one processor 304 (e.g., processor, micro-controller, digital signal processor (DSP), etc.), system memory component 306 (e.g., RAM), static storage component 308 (e.g., ROM), disk drive component 310 (e.g., magnetic or optical), one or more network interface components 312 (e.g., modem, Ethernet card, RF ID reader, RF and/or IRF transceiver, RF and/or IRF transmitter, and/or RF and/or IRF receiver), display component 314 (e.g., CRT or LCD), input component 316 (e.g., keyboard), cursor control component 318 (e.g., mouse or trackball), and image capture component 320 (e.g., analog or digital camera, scanner, barcode reader). In an implementation, disk drive component 310 may comprise a database having one or more disk drive components.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry (e.g., an FPGA (field programmable gate array) or an ASIC (application-specific integrated circuit)).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory may be supplemented by, or incorporated in special purpose logic circuitry.

To provide for interaction with a user, implementations may be implemented on a computer having a display device (e.g., a cathode ray tube (CRT), a light emitting diode (LED), or liquid crystal display (LCD) display device) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

Implementations may be implemented in a computing system that may include a back-end component (e.g., as a data server), or that may include a middleware component (e.g., an application server), or that may include a front-end component (e.g., a client computer having a graphical user interface or a Web browser) through which a user may interact with an implementation, or any combination of such back-end, middleware, or front-end components. Components may be interconnected by any form or medium of digital data communication (e.g., communication network). Examples of communication networks include a local area network (LAN) (e.g., the intranet) and a wide area network (WAN) (e.g., the Internet).

While certain features of described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein may include various combinations and/or sub-combinations of the functions, components and/or features of the different implementations described.

What is claimed is:

1. A method for thermal management of at least one processor positioned within a computing device, comprising:
    drawing external fluid into an enclosure of the computing device through an inlet aperture with use of at least one active pump positioned within the enclosure;
    directing the drawn fluid from the inlet aperture through an inlet channel formed within a first area of the enclosure to the at least one active pump;
    passing the drawn fluid over the at least one processor positioned within a second area of the enclosure by directing the drawn fluid from the at least one active pump through an outlet channel formed within the second area of the enclosure, wherein the active pump includes one or more moveable membrane structures, the movement of which generates a pressurized fluid flow along a path from the inlet channel to the outlet channel; and
    expelling the drawn fluid from the enclosure of the computing device via an outlet aperture with use of the at least one active pump after passing the drawn fluid over the at least one processor so as to provide thermal management of the at least one processor,
    wherein the inlet and outlet apertures are formed within a hinge assembly of the enclosure of the computing device.

2. The method of claim 1, wherein the inlet and outlet channels each comprises an enclosed space within the first and second areas, respectively, having interior walls that define an inlet fluid path and an outlet fluid path, respectively.

3. The method of claim 1, wherein drawing the external fluid into the enclosure comprises passing the drawn fluid through the at least one active pump to generate a pressurized fluid flow path from the inlet channel to the outlet channel.

4. The method of claim 1, wherein at least one of the moveable membrane structures lies in a plane and wherein a direction of the path from the inlet channel to the outlet channel is substantially parallel to the plane, and wherein a direction of movement of the membrane structure that generates the pressurized fluid flow is substantially perpendicular to the plane.

5. The method of claim 1, wherein the at least one active pump comprises at least one piezo pump.

6. The method of claim 1, wherein the fluid comprises at least one of a gas and a liquid including at least one of a coolant and a refrigerant.

7. The method of claim 1, wherein the fluid comprises air.

8. The method of claim 1, wherein the external fluid comprises a temperature that is less than a temperature of the at least one processor.

9. The method of claim 1, wherein passing the drawn fluid over the at least one processor comprises forcing the drawn fluid over the at least one processor by regulating the course of the drawn fluid through the outlet channel formed within the enclosure of the computing device.

10. The method of claim 1, wherein passing the drawn fluid over the at least one processor comprises using the at least one active pump to impinge the drawn fluid onto the at least one processor by forcibly guiding the drawn fluid through the outlet channel formed within the enclosure of the computing device.

11. A computing device comprising:
    at least one processor;
    an enclosure including an inlet aperture through which external fluid is drawn into the computing device;
    an active pump positioned within the enclosure and configured to draw the external fluid through the aperture into the computing device, the active pump including one or more moveable membrane structures, the movement of which generates a pressurized fluid flow along a path from an inlet channel to an outlet channel;
    the inlet channel formed within the enclosure for directing the drawn fluid from the inlet aperture through a first area of the enclosure to the at least one active pump;
    the outlet channel formed within the enclosure for directing the drawn fluid from the at least one active pump through a second area of the enclosure and for passing the drawn fluid over the at least one processor positioned in the second area of the enclosure; and
    an outlet aperture for expelling the drawn fluid from the enclosure of the computing device after passing the drawn fluid over the at least one processor so as to provide thermal management of the at least one processor,
    wherein the inlet and outlet apertures are formed within a hinge assembly of the enclosure of the computing device.

12. The computing device of claim 11, wherein the inlet and outlet channels each comprises an enclosed space within the first and second areas, respectively, having interior walls that define an inlet fluid path and an outlet fluid path, respectively.

13. The computing device of claim 11, wherein at least one of the moveable membrane structures lies in a plane that is substantially parallel to a direction of the path from the inlet channel to the outlet channel, and wherein movement of the membrane structure that generates the pressurized fluid flow is substantially perpendicular to the path.

14. The computing device of claim 11, wherein the at least one active pump comprises at least one piezo pump.

15. The computing device of claim 11, wherein the fluid comprises at least one of a gas and a liquid, including at least one of a coolant, a refrigerant, and air.

16. A system for thermal management of at least one processor positioned within a computing device, comprising:
- means for drawing external fluid into an enclosure of the computing device via an inlet aperture with use of at least one active pump positioned within the enclosure;
- means for directing the drawn fluid from the inlet aperture through an inlet channel formed within a first area of the enclosure to the at least one active pump;
- means for passing the drawn fluid over the at least one processor positioned within a second area of the enclosure by directing the drawn fluid from the at least one active pump through an outlet channel formed within the second area of the enclosure; and
- means for expelling the drawn fluid from the enclosure of the computing device via an outlet aperture with use of the at least one active pump after passing the drawn fluid over the at least one processor so as to provide thermal management of the at least one processor,
- wherein the inlet and outlet apertures are formed within a hinge assembly of the enclosure of the computing device.

17. The system of claim 16, wherein the inlet and outlet channels each comprises an enclosed space within the first and second areas, respectively, having interior walls that define an inlet fluid path and an outlet fluid path, respectively.

18. The system of claim 16, wherein the at least one active pump comprises at least one piezo pump having one or more membrane structures to generate a pressurized fluid flow path from the inlet channel to the outlet channel.

19. The system of claim 16, wherein the fluid comprises at least one of a gas and a liquid including at least one of a coolant, a refrigerant, and air.

20. A computing device of claim 11,
- wherein the hinge assembly mechanically connects different components of the computing device that are configured to rotate relative to each other about a fixed axis of rotation along an axis of the hinge assembly, and
- wherein the path from the inlet channel to the outlet channel includes a path through a hollow region formed in the hinge assembly.

* * * * *